(12) United States Patent
Sastry

(10) Patent No.: US 7,408,897 B2
(45) Date of Patent: Aug. 5, 2008

(54) METHOD FOR ASSIGNING HOME AGENT IN MOBILE NETWORK

(75) Inventor: Venkateshwara Sastry, Akkithimanahalli (IN)

(73) Assignee: Cisco Technology, Inc., San Jose, CA (US)

( * ) Notice: Subject to any disclaimer, the term of this patent is extended or adjusted under 35 U.S.C. 154(b) by 414 days.

(21) Appl. No.: 11/154,340

(22) Filed: Jun. 16, 2005

(65) Prior Publication Data

US 2006/0285525 A1  Dec. 21, 2006

(51) Int. Cl.
*H04Q 7/00* (2006.01)
*H04Q 7/20* (2006.01)
*H04L 12/28* (2006.01)
*H04L 1/00* (2006.01)

(52) U.S. Cl. .............. 370/328; 370/331; 370/332; 370/333; 370/252; 370/254; 370/238; 370/348; 370/329; 455/445

(58) Field of Classification Search ........... 370/328, 370/331–333, 252, 254, 238, 348, 329; 455/445
See application file for complete search history.

(56) References Cited

U.S. PATENT DOCUMENTS

| 6,771,635 | B1 | 8/2004 | Vilander et al. |
| 6,973,313 | B1 * | 12/2005 | Sebastian .................... 455/445 |
| 2002/0114323 | A1 * | 8/2002 | Chowdhury et al. ......... 370/352 |
| 2003/0119519 | A1 * | 6/2003 | Madour et al. ............. 455/453 |
| 2004/0203749 | A1 * | 10/2004 | Iyer et al. ................ 455/432.1 |
| 2006/0159042 | A1 * | 7/2006 | Borella ...................... 370/328 |
| 2006/0203791 | A1 * | 9/2006 | Carrion-Rodrigo et al. . 370/338 |

* cited by examiner

*Primary Examiner*—Vincent P. Harper
*Assistant Examiner*—Marisol Figueroa
(74) *Attorney, Agent, or Firm*—Trellis Intellectual Property Law Group, PC

(57) ABSTRACT

A method, system and apparatus for selecting an optimal home agent in a mobile IP network, are provided. The method enables selection of a topologically optimal home agent for establishing an efficient communication link. The method includes retrieving a set of home agents that are available for selection, and identifying a home agent from amongst the set of home agents. A home agent is selected based on one or more pre-defined parameters such as number of hops and time delay.

20 Claims, 6 Drawing Sheets

METHOD FOR ASSIGNING HOME AGENT IN MOBILE NETWORK

BACKGROUND OF THE INVENTION

1. Field of Invention

Embodiments of the invention relate in general to mobile networks. More specifically, the embodiments of the invention relate to methods and systems for optimizing communications in a mobile IP network.

2. Description of the Background Art

A mobile node, while moving out of the coverage of a home network, registers itself with a foreign network. Various protocols are available for establishing communication between mobile nodes in the mobile IP network. Examples of these protocols include mobile IPv4 in IS-835. The IPv4 protocol defines various methods for establishing communication between the mobile node (registered with the foreign network), and the home network.

In conventional methods based on IPv4 protocol, a home agent is selected in the home network that would communicate with a foreign agent in the foreign network. The foreign agent is in connection with the mobile node. The selection of the home agent is performed on a Remote Authentication Dial-In User Service (RADIUS) server. The RADIUS server is used for authenticating users, and establishing connections.

However, the RADIUS server is unable to select a home agent that is topologically optimal. This results in the setting of a non-optimal communication link between a home agent and a foreign agent.

DETAILED DESCRIPTION OF EMBODIMENTS OF THE INVENTION

The embodiments of the invention provide a method, a system, and an apparatus for selecting an optimal home agent in a mobile IP network. In an embodiment of the invention, mobile IP network is a Code Division Multiplexing Access (CDMA) network. In accordance with an embodiment of the invention, a set of home agents is retrieved and compared, to select one home agent that is topologically optimal for communication. The selection is based on one or more pre-defined parameters, which are measured for each data packet sent to various home agents. This measurement is performed by pinging the home agents. In various embodiments of the invention, the selection is performed by a foreign agent or a Packet Data Serving Node (PDSN).

Figure 1:
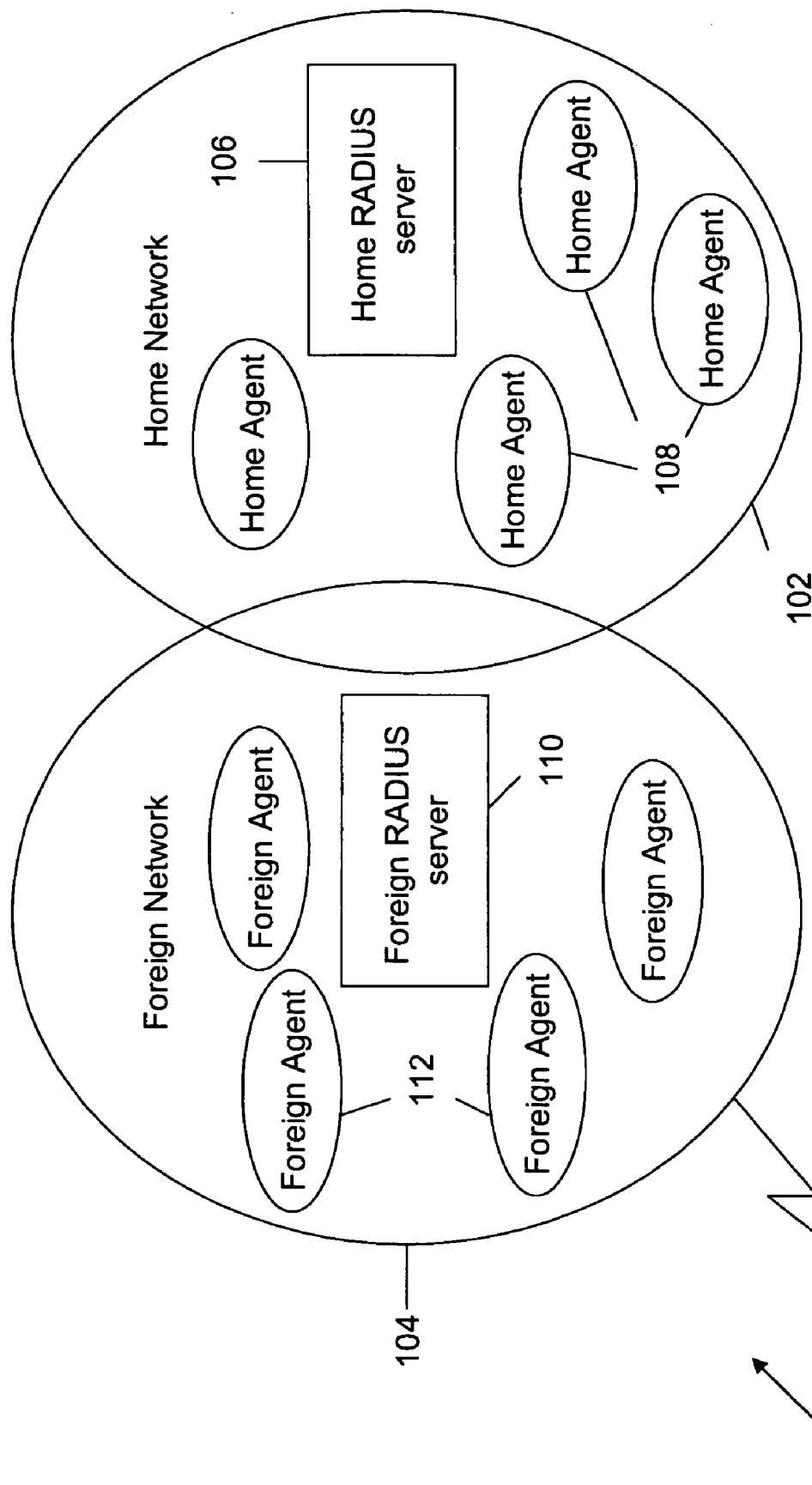
FIG. 1 illustrates an exemplary environment in which an exemplary embodiment of the invention functions.

FIG. 1 illustrates an exemplary environment in which the various embodiments of the invention functions. In accordance with an embodiment, a mobile IP network 100 includes a home network 102, and at least one foreign network 104. Home network 102 is a network, possibly virtual, having one or more network prefix. The network prefix will match that of a mobile node's address. Home network 102 further includes a home Remote Authentication Dial-In User Service (RADIUS) server 106, and a plurality of home agents 108, in accordance with an embodiment of the invention. Foreign network 104 includes a foreign RADIUS server 110, and a plurality of foreign agents 112. A home agent is router on a mobile node's home network, which tunnels data packets for delivery to the mobile node when it is away from the home network, and maintains current location information for the mobile node. Examples of the mobile node can be any mobile computational device having mobile connectivity with the mobile IP network, such as a cellular phone, PDA and so forth.

A Remote Authentication Dial-In User Service (RADIUS) server is a multi-user client-server security protocol based server used in computer networks to provide remote user authentication and accounting. The RADIUS software can read several kinds of password databases and use several kinds of authentication schemes. The protocol is described in RFC 2138, 2865, and 2866. DIAMETER protocol described in RFC 3588 can also be used in the place of RADIUS protocol for user authentication. In mobile IP applications, service for different geographical areas may be provided by different organizations. To provide uninterrupted service to a Mobile IP user, network service delivery may be provided by networks belonging to several service providers as the user traverses through different geographical areas.

In accordance with an embodiment of the invention, a mobile node 114 is in direct connection with a foreign agent 112. Foreign agent 112 uses foreign RADIUS server 110 to establish a connection with home RADIUS server 106 to identify home agents 108. In an embodiment of the invention, a foreign agent can be a router on a mobile node's visited network, which provides routing services to the mobile node. The foreign agent can retrieve and deliver datagrams/packets to the mobile node that were tunneled by the mobile node's home agent. For datagrams/packets sent by a mobile node, the foreign agent may serve as a default router for registered mobile nodes. In an embodiment of the invention, wherein the mobile IP network is CDMA network, foreign agent 112 is a Packet Data Serving Node (PDSN).

Figure 2:
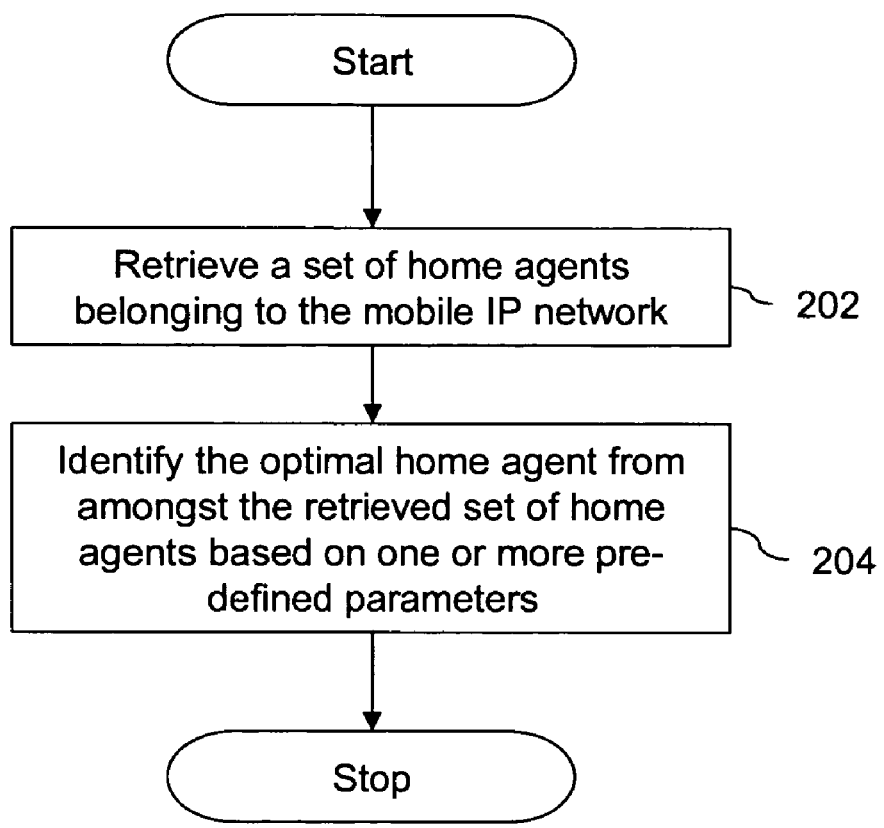
FIG. 2 is a flowchart illustrating an overview of the method for selecting an optimal home agent in a mobile IP network, in accordance with an embodiment of the invention.

FIG. 2 is a flowchart illustrating an overview of the method for selecting an optimal home agent in a mobile IP network, in accordance with an embodiment of the invention. In accordance with an embodiment of the invention, at step 202, a set of home agents is retrieved. The set of home agents is identified by a RADIUS server. A home agent is a router on the home network, which serves as a point for communications with the mobile node. At step 204, a home agent from amongst the set of home agents is selected based on one or more pre-defined parameters.

Examples of the pre-defined parameters include, but not limited to, number of hops between the foreign agent and the home agent, time delay in sending a packet from the foreign agent to the home agent. Others examples of these pre-defined parameters include the data loss realized while communicating a data packet between the foreign agent and the home agent. In accordance with an embodiment of the invention, various pre-defined parameters for selecting a home agent are assigned a priority. Depending on the assigned priority, the parameter having highest priority is compared first, and in case of equality, the next in priority parameter is compared to select the home agent.

Figure 3:
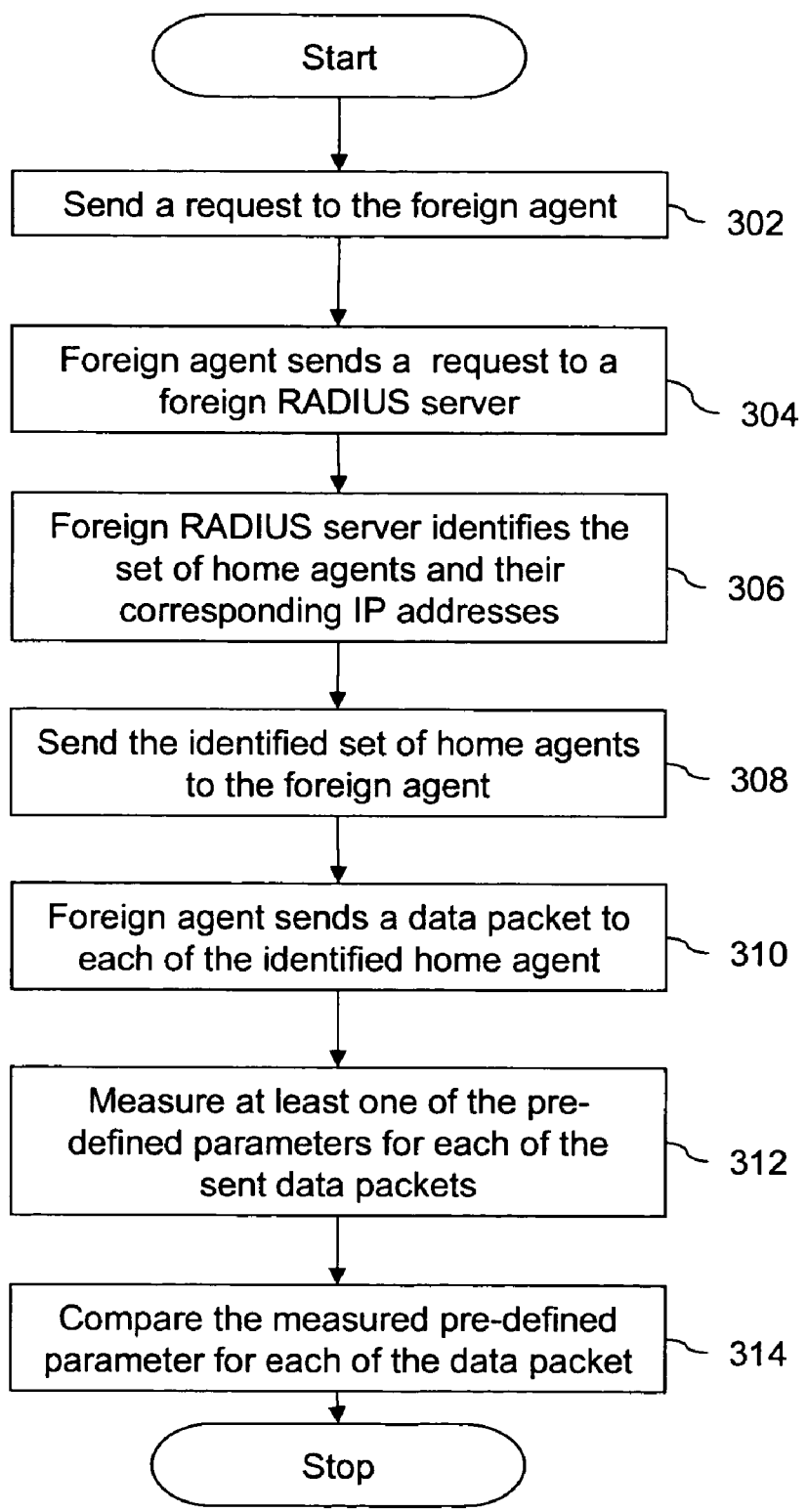
FIG. 3 is a flowchart illustrating a detailed method for selecting an optimal home agent in a mobile IP network, in accordance with an embodiment of the invention.

FIG. 3 is a flowchart illustrating a detailed method for selecting an optimal home agent in a mobile IP network, in accordance with an embodiment of the invention. At step 302, a request is sent to the foreign agent for establishing a communication link between a mobile node and the home network. The request is generated at the mobile node, in accordance with an embodiment of the invention. At step 304, the foreign agent sends an access request to a foreign RADIUS server in response to authenticate the mobile node. At step 306, the foreign RADIUS server identifies a set of home agents and their corresponding IP addresses after authenticating the mobile node. At step 308, the identified set of home agents is sent to the foreign agent in response to the request forwarded to the RADIUS server.

After receiving the set of home agents as identified by the RADIUS server, the foreign agent pings each of the home agent, as shown at step 310. At step 310, a data packet is sent to each of the identified home agent, in accordance with an embodiment of the invention. At step 312, at least one of the pre-defined parameters is measured for each of the sent data packets. In accordance with an embodiment of the invention, the number of hops is given highest priority as compared to other parameters. At step 314, the measured pre-defined parameter is compared and the home agent having the most optimal value of the pre-defined parameter is selected as the optimal home agent. For example, in case number of hops is the parameter to identify the optimal home agent, then the home agent that requires minimum number of hops for communication, is considered as the optimal home agent. In case the number of hops for more than one data packet takes the minimum value of hops, another pre-defined parameter, which is next in priority, is compared.

Figure 4:
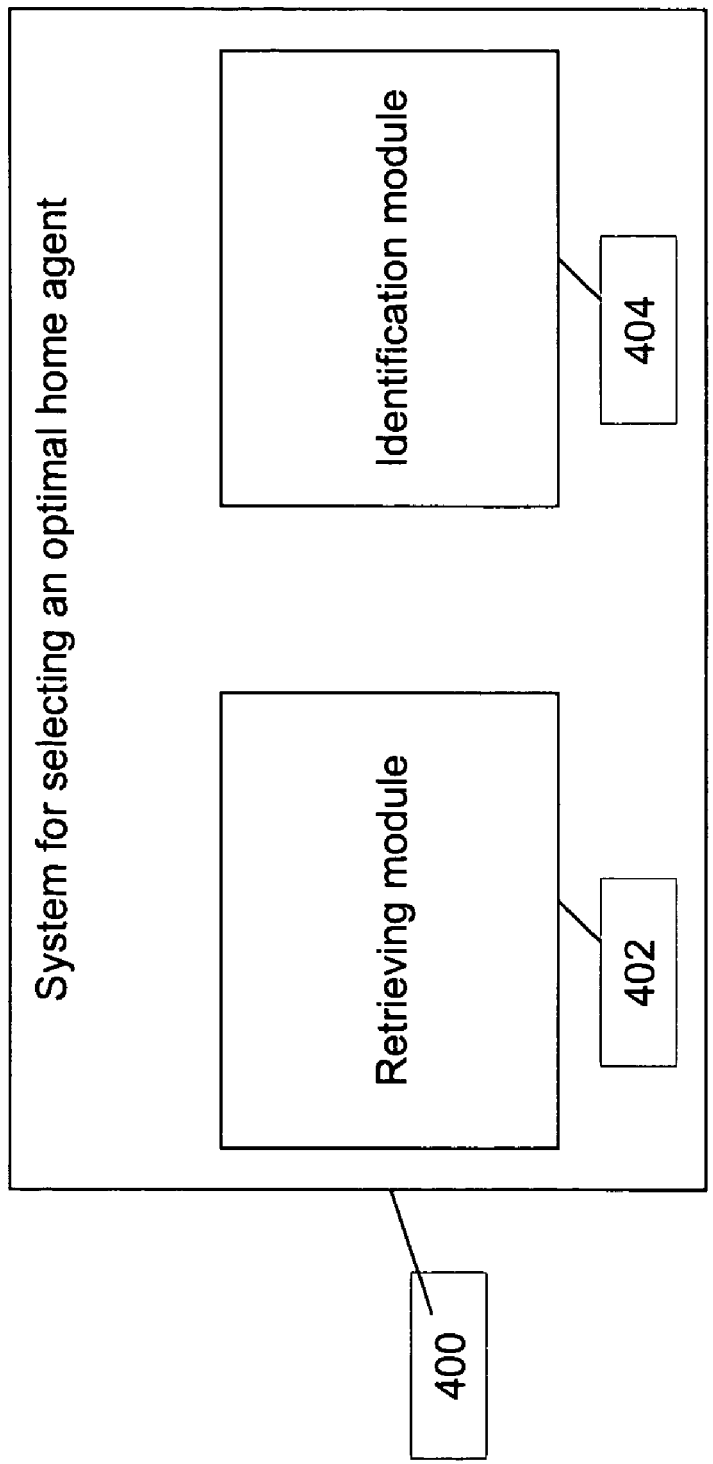
FIG. 4 is a block diagram illustrating a system for selecting an optimal home agent in a mobile IP network, in accordance with an embodiment of the invention.

FIG. 4 is a block diagram illustrating a system for selecting an optimal home agent in a mobile IP network, in accordance with an embodiment of the invention. In accordance with an embodiment, system 400 for selecting an optimal home agent includes a retrieving module 402, and an identification module 404. Retrieving module 402 retrieves a set of home agents. Identification module 404 selects a home agent from amongst the set of home agents based on one or more pre-defined parameters. The examples of the pre-defined parameters have been explained in conjunction with FIG. 3.

Figure 5:
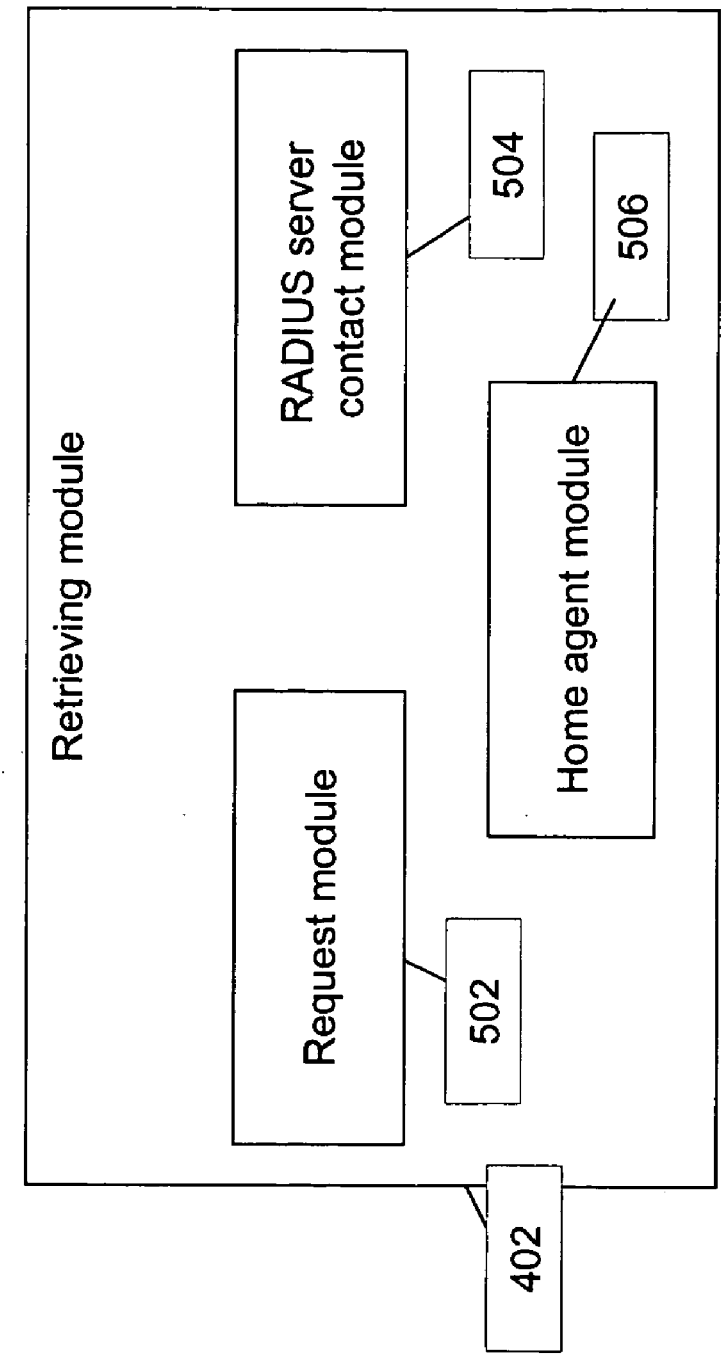
FIG. 5 is a block diagram illustrating a retrieving module, in accordance with an embodiment of the invention.

FIG. 5 is a block diagram illustrating retrieving module 402, in accordance with an embodiment of the invention. In accordance with an embodiment, retrieving module 402 includes a request module 502, a RADIUS server contact module 504, and a home agent module 506. Request module 502 generates and sends a request for retrieving the set of home agents. RADIUS server contact module 504 sends an access request to the RADIUS server for authenticating the mobile node that has send the request for home agents. Home agent module 506 identifies the set of home agents that are available for communication.

Figure 6:
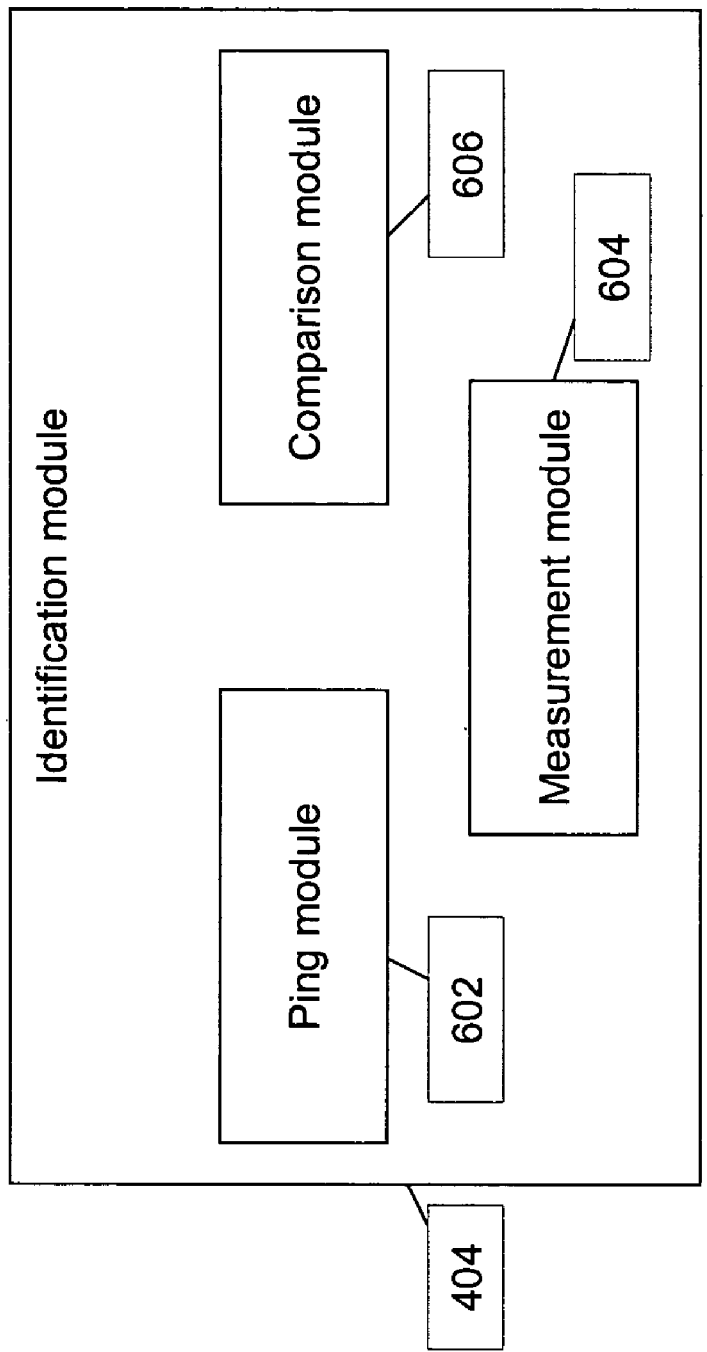
FIG. 6 is a block diagram illustrating an identification module, in accordance with an embodiment of the invention.

FIG. 6 is a block diagram illustrating an identification module, in accordance with an embodiment of the invention. In accordance with an embodiment, identification module 404 includes a ping module 602, a measurement module 604, and a comparison module 606. Ping module 602 sends a data packet to each of the home agent that belongs to the identified set of home agents. In an embodiment of the invention, ping module 602 can initiate ping to each of the home agents simultaneously. Measurement module 604 measures the value of the pre-defined parameters for each of the data packet. In an embodiment of the invention, the measured values for a home agent can be cached to avoid performing this step again for another request for optimal home agent. Comparison module 604 compares the pre-defined parameters of each sent data packet. In accordance with an embodiment of the invention, comparison module compares the number of hops and time delay for each of the data packet.

It is to be noted that as explained earlier, the RADIUS server is capable of receiving the access request for identifying a set of home agents and providing the set of identified home agents in response to the access request.

In various embodiments of the invention, each of system elements of system 400 is implemented in the form of software, hardware or their combination thereof.

Embodiments of the invention have the advantage that an optimal home agent is selected in a mobile IP network. Selection of the optimal home agent means lesser number of hops and shorter time delay for the data packets and hence efficient communication links are established. The optimality is achieved by selecting a topologically nearest home agent from amongst the identified set of home agents.

Another advantage of various embodiments of the invention is better mobile IP setup time. This advantage is realized because of the selection of an optimal home agent for establishing communication link in a mobile IP network.

Yet another advantage of various embodiments of the invention is the reduction in the triangular routing problem in the mobile IP network. This reduces the delay in the packet transfer from home agent to mobile node.

Although the invention has been discussed with respect to specific embodiments thereof, these embodiments are merely illustrative, and not restrictive, of the invention. For example, a 'method for selecting an optimal home agent in a mobile IP network' can include any type of analysis, manual or automatic.

Although specific protocols have been used to describe embodiments, other embodiments can use other transmission protocols or standards.

Any suitable programming language can be used to implement the routines of the invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the invention, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the invention.

Also in the description herein for embodiments of the invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the invention.

A 'computer readable medium' for purposes of embodiments of the invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory.

Reference throughout this specification to "one embodiment", "an embodiment", or "a specific embodiment" means that a particular feature, structure, or characteristic described in connection with the embodiment is included in at least one embodiment of the invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the invention may be combined in any suitable manner with one or more other embodiments. It is to be understood that other variations and modifications of the embodiments of the invention described and illustrated herein are possible in light of the teachings herein and are to be considered as part of the spirit and scope of the invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims

What is claimed is:

1. A method for selecting an optimal home agent in a mobile IP network, the mobile IP network comprising a plurality of mobile nodes, the method comprising
    sending an access request to an authentication server for authenticating a mobile node:
    receiving, at a foreign agent, a response from the authentication server including a plurality of home agents and their corresponding addresses in response to the access request, each of the set of home agents belonging to the mobile IP network; and
    determining, using the foreign agent, one or more predefined parameters for the plurality of home agents:
    identifying, at the foreign agent, a topologicallv optimal home agent for communication from amongst the plurality of home agents based on one or more pre-defined parameters.

2. The method of claim 1, wherein the mobile IP network is a Code Division Multiple Access (CDMA) network.

3. The method of claim 1, wherein the foreign agent comprises a Packet Data Serving Node (PDSN).

4. The method of claim 1, wherein the identifying the optimal home agent comprises
    sending a data packet to each home agent belonging to the retrieved set of home agents; and
    measuring at least one pre-defined parameter in the one or more parameters for each of the data packets; and
    comparing the measured at least one pre-defined parameter for each of the data packets to identify the optimal home agent.

5. The method of claim 4, wherein the pre-defined parameters comprise at least one of hop count and time delay associated with the data packet.

6. The method of claim 1, wherein the foreign agent has knowledge of the topology of the mobile IP network for communicating with the plurality of home agents and can select the topologically optimal home agent to communicate with based on the knowledge.

7. The method of claim 6, wherein the authentication server does not have knowledge of the topology of the mobile IP network for communication between foreign agent with the plurality of home agents.

8. A system for selecting an optimal home agent in a mobile IP network, the mobile IP network comprising a plurality of mobile nodes, the system comprising
- a sender configured to send an access request to an authentication server for authenticating a mobile node:
- a receiver conficured to receive, at a foreign agent, a response from the authentication server including a plurality of home agents and their corresponding addresses in response to the access request; and
- a parameter determiner configured to determine, using the foreign agent, one or more pre-defined parameters for the plurality of home agents;
- an identification module to identify, at the foreign agent, a topologically optimal home agent for communication from amongst the plurality of home agents based on one or more pre-defined parameters.

9. The system of claim 8, wherein the identification module comprises
- a ping module for sending a data packet to each home agent belonging to the retrieved set of home agents;
- a measurement module for measuring at least one of the pre-defined parameters; and
- a comparison module for comparing a number of hops and a time delay for each of the sent data packets, wherein the comparison is used to identify the optimal home agent.

10. A system of claim 8, wherein the foreign agent has knowledge of the topology of the mobile IP network for communicating with the plurality of home agents and can select the topologically optimal home agent to communicate with based on the knowledge.

11. The system of claim 10, wherein the authentication server does not have knowledge of the topology of the mobile IP network for communication between foreign agent with the plurality of home agents.

12. A system for selecting an optimal home agent in a mobile IP network, the mobile IP network comprising a plurality of mobile nodes, the system comprising
- means for sending an access request to an authentication server for authenticating a mobile node;
- means for receiving, at a foreign agent, a response from the authentication server including a plurality of home agents and their corresponding addresses in response to the access request;
- means for sending a data packet to each home agent belonging to the retrieved set of home agents;
- means for measuring at least one pre-defined parameter; and
- means for determining, using the foreign agent, one or more pre-defined parameters for the plurality of home agents;
- means for identifying, at the foreign agent, a topologically optimal home agent for communication from amongst the plurality of home agents based on one or more pre-defined parameters.

13. A system of claim 12, wherein the foreign agent has knowledge of the topology of the mobile IP network for communicating with the plurality of home agents and can select the topologically optimal home agent to communicate with based on the knowledge.

14. The system of claim 13, wherein the authentication server does not have knowledge of the topology of the mobile IP network for communication between foreign agent with the plurality of home agents.

15. An apparatus for selecting an optimal home agent in a mobile IP network, the mobile IP network comprising a plurality of mobile nodes, the apparatus comprising
- a processing system including a processor coupled to a display and user input device; and
- a machine-readable medium including instructions executable by the processor comprising
- one or more instructions for sending an access request to an authentication server for authenticating a mobile node:
- one or more instructions for receiving, at a foreign agent, a response from the authentication server including a plurality of home agents, each of the set of home agents belonging to the mobile IP network; and
- one or more instructions for determining, using the foreign agent, one or more pre-defined parameters for the plurality of home agents:
- one or more instructions for identifying, at the foreign agent, a topologically optimal home agent for communication from amongst the retrieved set of home agents based on one or more pre-defined parameters.

16. An apparatus of claim 15, wherein the foreign agent has knowledge of the topology of the mobile IP network for communicating with the plurality of home agents and can select the topologically optimal home agent to communicate with based on the knowledge.

17. The apparatus of claim 16, wherein the authentication server does not have knowledge of the topology of the mobile IP network for communication between foreign agent with the plurality of home agents.

18. An authentication server in a mobile IP network, the authentication server configured to:
- receiving an access request for identifying a set of home agents, the access request being received from a foreign agent for a mobile node in the mobile IP network;
- determining a plurality of home agents for the mobile node; and
- providing the plurality of determined home agents in response to the access request, the identified home agents allowing the foreign agent to select a topologically optimal home agent for communication between a mobile node and a home network.

19. The authentication server of claim 18, wherein the foreign agent has knowledge of the topology of the mobile IP network for communicating with the plurality of home agents and can select the topologically optimal home agent to communicate with based on the knowledge.

20. The authentication server of claim 19, wherein the authentication server does not have knowledge of the topology of the mobile IP network for communication between foreign agent with the plurality of home agents.

* * * * *